(12) United States Patent
Levantovsky (10) Patent No.: US 9,319,444 B2
(45) Date of Patent: Apr. 19, 2016

(54) FONT DATA STREAMING

(75) Inventor: Vladimir Levantovsky, North Andover, MA (US)

(73) Assignee: Monotype Imaging Inc., Woburn, MA (US)

( * ) Notice: Subject to any disclaimer, the term of this patent is extended or adjusted under 35 U.S.C. 154(b) by 122 days.

(21) Appl. No.: 12/457,792

(22) Filed: Jun. 22, 2009

(65) Prior Publication Data

US 2010/0321393 A1    Dec. 23, 2010

(51) Int. Cl.
| | |
|---|---|
| G06T 11/00 | (2006.01) |
| H04L 29/06 | (2006.01) |
| G06F 17/21 | (2006.01) |
| H04N 21/235 | (2011.01) |
| H04N 21/236 | (2011.01) |
| H04N 21/434 | (2011.01) |
| H04N 21/435 | (2011.01) |
| H04N 21/81 | (2011.01) |

(52) U.S. Cl.
CPC .......... *H04L 65/4076* (2013.01); *G06F 17/214* (2013.01); *H04L 65/60* (2013.01); *H04N 21/235* (2013.01); *H04N 21/23617* (2013.01); *H04N 21/435* (2013.01); *H04N 21/4349* (2013.01); *H04N 21/8146* (2013.01)

(58) Field of Classification Search
USPC ......................................................... 345/467
See application file for complete search history.

(56) References Cited

U.S. PATENT DOCUMENTS

| | | | |
|---|---|---|---|
| 4,244,657 A | 1/1981 | Wasylyk | |
| 5,347,266 A | 9/1994 | Bauman et al. | |
| 5,412,771 A | 5/1995 | Fenwick | |
| 5,416,898 A | 5/1995 | Opstad et al. | |
| 5,444,829 A | 8/1995 | Kawabata et al. | |
| 5,453,938 A | 9/1995 | Gohara et al. | |
| 5,526,477 A | 6/1996 | McConnell et al. | |
| 5,528,742 A | 6/1996 | Moore et al. | |
| 5,533,174 A * | 7/1996 | Flowers et al. | 358/1.15 |
| 5,586,242 A | 12/1996 | McQueen et al. | |
| 5,606,649 A * | 2/1997 | Tai | 358/1.11 |
| 5,630,028 A | 5/1997 | DeMeo | |
| 5,737,599 A | 4/1998 | Rowe et al. | |

(Continued)

FOREIGN PATENT DOCUMENTS

| | | |
|---|---|---|
| EP | 2166488 A2 | 3/2010 |
| JP | 06-258982 | 9/1994 |

(Continued)

OTHER PUBLICATIONS

International Search Report & Written Opinion issued in PCT application No. PCT/US10/01272, mailed Jun. 15, 2010, 6 pages.

(Continued)

*Primary Examiner* — M Good Johnson
(74) *Attorney, Agent, or Firm* — Fish & Richardson P.C.

(57) ABSTRACT

Provided is a method for font data streaming for time-based video/audio presentations where content is transmitted in small increments and transmission continues while a previously transmitted portion is viewed or played. Different subsets of characters of the same font are assembled together on a device and previously sent characters are reused for rendering subsequent text strings. Font subsets are created to provide only a minimal number of glyphs for the character set coverage, thereby reducing the redundancy of font data transmission and reducing the total number of characters transmitted.

16 Claims, 3 Drawing Sheets

(56) References Cited

U.S. PATENT DOCUMENTS

| | | | |
|---|---|---|---|
| 5,748,975 A | 5/1998 | Van De Vanter | |
| 5,781,714 A | 7/1998 | Collins et al. | |
| 5,877,776 A | 3/1999 | Beaman et al. | |
| 5,940,581 A | 8/1999 | Lipton | |
| 6,012,071 A | 1/2000 | Krishna et al. | |
| 6,031,549 A | 2/2000 | Hayes-Roth | |
| 6,044,205 A | 3/2000 | Reed et al. | |
| 6,065,008 A * | 5/2000 | Simon et al. | 1/1 |
| 6,073,147 A * | 6/2000 | Chan et al. | 715/234 |
| 6,111,654 A | 8/2000 | Cartier | |
| 6,141,002 A | 10/2000 | Kanungo et al. | |
| 6,249,908 B1 | 6/2001 | Stamm | |
| 6,252,671 B1 | 6/2001 | Peng et al. | |
| 6,282,327 B1 | 8/2001 | Betrisey | |
| 6,313,920 B1 | 11/2001 | Dresevic et al. | |
| 6,320,587 B1 | 11/2001 | Funyu | |
| 6,330,577 B1 | 12/2001 | Kim | |
| 6,343,301 B1 * | 1/2002 | Halt et al. | 701/450 |
| 6,426,751 B1 | 7/2002 | Patel | |
| 6,490,051 B1 | 12/2002 | Nguyen et al. | |
| 6,512,531 B1 | 1/2003 | Gartland | |
| 6,522,330 B2 | 2/2003 | Kobayashi | |
| 6,522,347 B1 | 2/2003 | Tsuji | |
| 6,583,789 B1 | 6/2003 | Carlson et al. | |
| 6,657,625 B1 | 12/2003 | Chik et al. | |
| 6,675,358 B1 | 1/2004 | Kido | |
| 6,678,688 B1 | 1/2004 | Unruh | |
| 6,687,879 B1 | 2/2004 | Teshima | |
| 6,704,116 B1 | 3/2004 | Abulhab | |
| 6,704,648 B1 * | 3/2004 | Naik et al. | 701/532 |
| 6,718,519 B1 | 4/2004 | Taieb | |
| 6,738,526 B1 | 5/2004 | Betrisey | |
| 6,754,875 B1 | 6/2004 | Paradies | |
| 6,760,029 B1 | 7/2004 | Phinney et al. | |
| 6,771,267 B1 | 8/2004 | Muller | |
| 6,810,504 B2 | 10/2004 | Cooper et al. | |
| 6,813,747 B1 | 11/2004 | Taieb | |
| 6,853,980 B1 | 2/2005 | Ying et al. | |
| 6,856,317 B2 | 2/2005 | Konsella et al. | |
| 6,882,344 B1 | 4/2005 | Hayes et al. | |
| 6,901,427 B2 | 5/2005 | Teshima | |
| 6,907,444 B2 | 6/2005 | Narasimhan et al. | |
| 6,952,210 B1 | 10/2005 | Renner et al. | |
| 6,993,538 B2 * | 1/2006 | Gray | 340/988 |
| 7,050,079 B1 | 5/2006 | Estrada et al. | |
| 7,064,757 B1 | 6/2006 | Opstad et al. | |
| 7,064,758 B2 | 6/2006 | Chik et al. | |
| 7,155,672 B1 * | 12/2006 | Adler et al. | 715/210 |
| 7,184,046 B1 | 2/2007 | Hawkins | |
| 7,188,313 B2 | 3/2007 | Hughes et al. | |
| 7,228,501 B2 | 6/2007 | Brown et al. | |
| 7,346,845 B2 | 3/2008 | Teshima et al. | |
| 7,477,988 B2 * | 1/2009 | Dorum | 701/410 |
| 7,492,365 B2 | 2/2009 | Corbin et al. | |
| 7,505,040 B2 | 3/2009 | Stamm et al. | |
| 7,539,939 B1 | 5/2009 | Schomer | |
| 7,552,008 B2 * | 6/2009 | Newstrom et al. | 701/468 |
| 7,580,038 B2 * | 8/2009 | Chik et al. | 345/467 |
| 7,583,397 B2 * | 9/2009 | Smith | 358/1.15 |
| 7,636,885 B2 | 12/2009 | Merz et al. | |
| 7,701,458 B2 * | 4/2010 | Sahuc et al. | 345/471 |
| 7,752,222 B1 | 7/2010 | Cierniak | |
| 7,768,513 B2 | 8/2010 | Klassen | |
| 7,836,094 B2 | 11/2010 | Ornstein et al. | |
| 7,882,432 B2 | 2/2011 | Nishikawa et al. | |
| 7,944,447 B2 | 5/2011 | Clegg et al. | |
| 7,958,448 B2 | 6/2011 | Fattic et al. | |
| 8,098,250 B2 | 1/2012 | Clegg et al. | |
| 8,201,088 B2 | 6/2012 | Levantovsky et al. | |
| 8,201,093 B2 * | 6/2012 | Tuli | 715/746 |
| 8,306,356 B1 | 11/2012 | Bever | |
| 8,381,115 B2 * | 2/2013 | Tranchant et al. | 715/764 |
| 8,413,051 B2 | 4/2013 | Bacus et al. | |
| 8,601,374 B2 | 12/2013 | Parham | |
| 8,643,542 B2 | 2/2014 | Wendel | |
| 8,689,101 B2 * | 4/2014 | Fux et al. | 715/269 |
| 8,731,905 B1 | 5/2014 | Tsang | |
| 2001/0052901 A1 | 12/2001 | Kawabata et al. | |
| 2002/0010725 A1 | 1/2002 | Mo | |
| 2002/0033824 A1 | 3/2002 | Stamm | |
| 2002/0052916 A1 | 5/2002 | Kloba et al. | |
| 2002/0087702 A1 | 7/2002 | Mori | |
| 2002/0093506 A1 | 7/2002 | Hobson | |
| 2002/0174186 A1 | 11/2002 | Hashimoto et al. | |
| 2002/0194261 A1 * | 12/2002 | Teshima | 709/203 |
| 2003/0014545 A1 | 1/2003 | Broussard et al. | |
| 2003/0076350 A1 | 4/2003 | Vu | |
| 2003/0197698 A1 | 10/2003 | Perry et al. | |
| 2004/0025118 A1 | 2/2004 | Renner | |
| 2004/0088657 A1 | 5/2004 | Brown et al. | |
| 2004/0119714 A1 | 6/2004 | Everett et al. | |
| 2004/0177056 A1 | 9/2004 | Davis et al. | |
| 2004/0189643 A1 | 9/2004 | Frisken et al. | |
| 2004/0207627 A1 | 10/2004 | Konsella et al. | |
| 2005/0033814 A1 | 2/2005 | Ota | |
| 2005/0094173 A1 * | 5/2005 | Engelman et al. | 358/1.11 |
| 2005/0111045 A1 * | 5/2005 | Imai | 358/1.18 |
| 2005/0128508 A1 | 6/2005 | Greeff et al. | |
| 2005/0149942 A1 | 7/2005 | Venkatraman | |
| 2005/0190186 A1 | 9/2005 | Klassen | |
| 2005/0193336 A1 | 9/2005 | Fux et al. | |
| 2005/0200871 A1 | 9/2005 | Miyata | |
| 2005/0264570 A1 | 12/2005 | Stamm | |
| 2005/0270553 A1 | 12/2005 | Kawara | |
| 2005/0275656 A1 | 12/2005 | Corbin et al. | |
| 2006/0010371 A1 | 1/2006 | Shur et al. | |
| 2006/0017731 A1 | 1/2006 | Matskewich et al. | |
| 2006/0061790 A1 | 3/2006 | Miura | |
| 2006/0072136 A1 | 4/2006 | Hodder et al. | |
| 2006/0072137 A1 | 4/2006 | Nishikawa et al. | |
| 2006/0072162 A1 | 4/2006 | Nakamura | |
| 2006/0103653 A1 * | 5/2006 | Chik et al. | 345/467 |
| 2006/0103654 A1 * | 5/2006 | Chik et al. | 345/467 |
| 2006/0168639 A1 | 7/2006 | Gan | |
| 2006/0245727 A1 | 11/2006 | Nakano et al. | |
| 2006/0267986 A1 | 11/2006 | Bae et al. | |
| 2006/0269137 A1 | 11/2006 | Evans | |
| 2006/0285138 A1 | 12/2006 | Merz et al. | |
| 2007/0002016 A1 | 1/2007 | Cho et al. | |
| 2007/0006076 A1 | 1/2007 | Cheng | |
| 2007/0008309 A1 * | 1/2007 | Sahuc et al. | 345/418 |
| 2007/0050419 A1 | 3/2007 | Weyl et al. | |
| 2007/0055931 A1 | 3/2007 | Zaima | |
| 2007/0139412 A1 | 6/2007 | Stamm | |
| 2007/0139413 A1 | 6/2007 | Stamm et al. | |
| 2007/0159646 A1 | 7/2007 | Adelberg et al. | |
| 2007/0172199 A1 | 7/2007 | Kobayashi | |
| 2007/0211062 A1 | 9/2007 | Engleman et al. | |
| 2007/0283047 A1 * | 12/2007 | Theis et al. | 709/246 |
| 2008/0028304 A1 | 1/2008 | Levantovsky et al. | |
| 2008/0030502 A1 | 2/2008 | Chapman | |
| 2008/0154911 A1 * | 6/2008 | Cheng | 707/10 |
| 2008/0282186 A1 | 11/2008 | Basavaraju | |
| 2008/0303822 A1 | 12/2008 | Taylor | |
| 2008/0306916 A1 | 12/2008 | Gonzalez et al. | |
| 2009/0031220 A1 | 1/2009 | Tranchant | |
| 2009/0158134 A1 | 6/2009 | Wang | |
| 2009/0275351 A1 | 11/2009 | Jeung et al. | |
| 2009/0287998 A1 | 11/2009 | Kalra | |
| 2009/0303241 A1 | 12/2009 | Priyadarshi et al. | |
| 2009/0307585 A1 | 12/2009 | Tranchant et al. | |
| 2010/0088606 A1 * | 4/2010 | Kanno | 715/733 |
| 2010/0088694 A1 | 4/2010 | Peng | |
| 2010/0091024 A1 | 4/2010 | Myadam | |
| 2010/0115454 A1 * | 5/2010 | Tuli | 715/780 |
| 2010/0164984 A1 | 7/2010 | Rane | |
| 2010/0231598 A1 | 9/2010 | Hernandez et al. | |
| 2010/0275161 A1 | 10/2010 | DiCamillo | |
| 2011/0090229 A1 | 4/2011 | Bacus et al. | |
| 2011/0090230 A1 | 4/2011 | Bacus et al. | |
| 2011/0093565 A1 | 4/2011 | Bacus et al. | |
| 2011/0115797 A1 | 5/2011 | Kaplan | |
| 2011/0131153 A1 | 6/2011 | Grim, III | |
| 2011/0188761 A1 | 8/2011 | Boutros et al. | |

(56) References Cited

U.S. PATENT DOCUMENTS

| | | |
|---|---|---|
| 2011/0238495 A1 | 9/2011 | Kang |
| 2011/0271180 A1 | 11/2011 | Lee |
| 2011/0276872 A1 | 11/2011 | Kataria |
| 2011/0289407 A1 | 11/2011 | Naik |
| 2011/0310432 A1 | 12/2011 | Waki |
| 2012/0001922 A1 | 1/2012 | Escher et al. |
| 2012/0016964 A1 | 1/2012 | Veen et al. |
| 2012/0033874 A1 | 2/2012 | Perronnin |
| 2012/0066590 A1 | 3/2012 | Harris et al. |
| 2012/0072978 A1 | 3/2012 | DeLuca |
| 2012/0092345 A1 | 4/2012 | Joshi et al. |
| 2012/0102176 A1 | 4/2012 | Lee et al. |
| 2012/0102391 A1 | 4/2012 | Lee et al. |
| 2012/0127069 A1 | 5/2012 | Santhiveeran et al. |
| 2012/0215640 A1 | 8/2012 | Ramer et al. |
| 2012/0306852 A1 | 12/2012 | Taylor |
| 2012/0307263 A1 | 12/2012 | Ichikawa et al. |
| 2012/0323694 A1 | 12/2012 | Lita et al. |
| 2012/0323971 A1 | 12/2012 | Pasupuleti |
| 2013/0033498 A1 | 2/2013 | Linnerud |
| 2013/0120396 A1 | 5/2013 | Kaplan |
| 2013/0127872 A1 | 5/2013 | Kaplan |
| 2013/0163027 A1 | 6/2013 | Shustef |
| 2013/0179761 A1 | 7/2013 | Cho |
| 2013/0215133 A1 | 8/2013 | Gould et al. |
| 2014/0025756 A1 | 1/2014 | Kamens |
| 2014/0153012 A1 | 6/2014 | Seguin |
| 2015/0100882 A1 | 4/2015 | Severenuk |

FOREIGN PATENT DOCUMENTS

| | | |
|---|---|---|
| JP | 10-124030 | 5/1998 |
| JP | 2002-507289 | 3/2002 |
| JP | 05-215915 | 8/2005 |
| JP | 05-217816 | 8/2005 |
| JP | 07-011733 | 1/2007 |
| TW | 544595 | 8/2003 |
| TW | 2005/11041 | 3/2005 |
| WO | WO 94/23379 | 10/1994 |
| WO | WO 99/00747 | 1/1999 |
| WO | WO 01/91088 | 11/2001 |
| WO | WO 03/023614 | 3/2003 |
| WO | WO 2004/012099 | 2/2004 |
| WO | WO 2005/001675 | 1/2005 |

OTHER PUBLICATIONS

Adobe Systems Incorporated, "The Type 42 Font Format Specification," Technical Note #5012, Jul. 31, 1998, pp. 1-24.

Adobe Systems Incorporated, "PostScript Language Reference—Third Edition," Feb. 1999, pp. 313-390.

Adobe Systems Incorporated, "To Unicode Mapping File Tutorial," Adobe Technical Note, XP002348387, May 2003.

Apple Computers, "The True Type Font File," Oct. 27, 2000, pp. 1-17.

Celik et al., "W3C, CSS3 Module: Fonts," W3C Working Draft, Jul. 31, 2001, pp. 1-30.

Japanese Office Action, 2009-521768, mailed Aug. 28, 2012.

Supplementary European Search Report, European Patent Office, European patent application No. EP 07796924, dated Dec. 27, 2010, 8 pages.

TrueType Fundamentals, Microsoft Typography, Nov. 1997, pp. 1-17.

Announcing Speakeasy: A new open-source language tool from Typekit, Oct. 28, 2010, on-line http://blog.typekit.com/2010/10/28/announcing-speakeasy-a-new-open-source-language-tool-from-typekit/.

International Search Report & Written Opinion issued in PCT application No. PCT/US2011/034050 dated Jul. 15, 2011, 13 pages.

International Search Report & Written Opinion, PCT/US2013/026051, mailed Jun. 5, 2013, 9 pages.

Doughty, Mike, "Using OpenType® Fonts with Adobe® InDesign®," Jun. 11, 2012 retrieved from the internet: http://webarchive.org/web/20121223032924/http://www.sketchpad.net/opentype-indesign.htm (retrieved Sep. 22, 2014), 2 pages.

Goswami, Gautum, "Quite 'Writly' Said!," One Brick at a Time, Aug. 21, 2006, Retrieved from the internet: :http://gautamg.wordpress.com/2006/08/21/quj.te-writely-said/ (retrieved on Sep. 23, 2013), 3 pages.

International Search Report & Written Opinion, PCT/US2014/010786, mailed Sep. 30, 2014, 9 pages.

Wenzel, Martin, "An Introduction to OpenType Substitution Features," Dec. 26, 2012, Retrieved from the internet: http://web.archive.org/web/20121226233317/http://ilovetypography.com/OpenType/opentype-features. Html (retrieved on Sep. 18, 2014), 12 pages.

"A first experiment with multicoloured web fonts," Manufactura Independente website, Feb. 28, 2011, Retrieved from the internet: http://blog.manufacturaindependente.org/2011/02/a-first-experiment-with-multicoloured-web-fonts/.

"colorfont/vl," Feb. 28, 2011, retrieved from the internet: http://manufacturaindependente.com/colorfont/v1/.

Extensis, Suitcase 10.2, Quick Start Guide for Macintosh, 2001, 23 pgs.

International Search Report & Written Opinion, PCT/US2013/071519, mailed Mar. 5, 2014, 12 pages.

International Search Report & Written Opinion, PCT/US2013/076917, mailed Jul. 9, 2014, 11 pages.

Open Text Exceed, User's Guide, Version 14, Nov. 2009, 372 pgs.

"photofont.com—Use photofonts," Sep. 2, 2012, retrieved from the internet: http://web.archive.org/web/20120902021143/http://photofont.com/photofont/use/web.

Universal Type Server, Upgrading from Suitcase Server, Sep. 29, 2009, 18 pgs.

Japanese Office Action, 2013-508184, mailed Apr. 1, 2015.

International Preliminary Report on Patentability issued in PCT application No. PCT/US2013/071519 dated Jun. 9, 2015, 9 pages.

European Search Report, 14187549.2, Jul. 30, 2015 7 pages.

Saurabh, Kataria et al., "Font retrieval on a large scale: An experimental study", 2010 $17_{th}$ IEEE International Conference on Image Processing (ICIP 2010); Sep. 26-29, 2010; Hong Kong, China, IEEE, Piscataway, NJ, USA, Sep. 26, 2010, pp. 2177-2180.

European Search Report, 14184499.3, Jul. 13, 2015, 7 pages.

"Flash CS4 Professional ActionScript 2.0", 2007, retrieved on http://help.adobe.com/en_US/AS2LCR/Flash_10.0/help.htm1?content=00000284.html on Aug. 31, 2015.

European Search Report, 13179728.4, Sep. 10, 2015, 3 pages.

Ma Wei-Ying et al., "Framework for adaptive content delivery in heterogeneous network environments", Jan. 24, 2000, Retrieved from the Internet: http://www.cooltown.hp.com/papers/adcon/MMCN2000.

"Saffron Type System", retrieved from the internet Nov. 12, 2014, 7 pages.

\* cited by examiner

FONT DATA STREAMING

FIELD OF THE INVENTION

The present disclosure relates generally to font data streaming, and more particularly to reducing the redundancy in font data transmissions.

BACKGROUND OF THE INVENTION

In digital broadcasting, a digital device (e.g., cable box) receives mixed media information. Interactive multimedia presentations combine a number of different elementary objects including, but not limited to, 2D and 3D vector graphics content, video, audio objects, text, scene composition, and layout information. Text content is encoded as a sequence of Unicode character codes. However, the character code only defines the semantical meaning of a character (e.g., Latin lowercase character 'a') and it does not provide any information about the character's visual appearance. In order to visualize text information, font data has to be present. The text may then be displayed by rendering images of each character using the font data. A device receiving digital broadcasts may have a resident font available to display the text, but several conditions may occur.

One condition that may occur is that resident font metrics may be incompatible with the layout of the multimedia presentation. A font may be too small or too large, which may lead to a break in the viewing experience of the presentation. For example, if a font is too small, the text may not be readable, or the layout of the multimedia content may be broken. On the other hand, if the font is too large, content layout may also be broken and/or portions of the text may be cut off (e.g., content menu entries, in which each entry is limited to a single line of text).

Another condition that may occur is that a resident font may not satisfy stylistic requirements. For example, a graphic content design may require a particular typeface or font style (e.g., "*Content Title*" vs. "Content Title").

In addition, a resident font may not support the character set required by the application or content. For example, a user may access web or multimedia content that requires non-Latin character set support. If these additional characters are not supported by the resident font, the text display will be broken (e.g., missing characters will be displayed using a rectangular box).

Thus, in order for a media content to be faithfully rendered on a device (e.g., set-top box, mobile phone, PDA, computer system, etc.) where selected fonts may not be available, the fonts have to be embedded in the content, or transmitted as a separate resource. The receiving terminal would then have necessary font data for text rendering. However, font data may be quite large and transmitting a complete font may not be possible in real time and/or in bandwidth-constrained environments.

In the digital media industry to date, one known approach is to download a complete font (or font subset) file to a remote terminal in advance of sending the media content, to ensure that necessary font information is available when the text is to be rendered. However, this approach does not work in a broadcast environment, in which a media presentation is continuously updated in real time and the receiving terminal can tune into the broadcast at any arbitrary moment in time.

Another known approach involves subdividing font data into smaller data blocks and repeatedly transmitting them using data carousel mechanisms. In the carousel mechanism, all of the information necessary for the display of a broadcast is downloaded so that even if a user misses an original download (e.g., viewing) of the broadcast, the information is retained in the carousel and can be re-accessed. Thus, this approach ensures that, regardless of the moment when the initial broadcast starts, the terminals that tuned in later will receive (and collate) all necessary font data blocks.

The carousel may comprise a mixed file including subset fonts. Characters not required for use may be removed. Removal of the characters may involve subsetting of the fonts/characters that are not to be used. For example, if both Latin and Cyrillic characters are present in the original font and the program's text content is in English, the Cyrillic characters may be removed. Subsets may be created in advance (e.g., statically) and downloaded periodically. The same information may be repeated in portions and put in the carousel. However, the data carousel mechanism approach is extremely redundant in that it requires the same data to be continuously re-sent to satisfy real-time requirements.

SUMMARY OF THE INVENTION

Exemplary embodiments of the invention provide for font data streaming to reduce the redundancy of font data transmissions, thereby reducing the total number of characters for which data is transmitted during any given transmission.

According to exemplary embodiments, a method of font data streaming may comprise subdividing a data stream into data segments, and analyzing the text content of a first data segment to determine required fonts and an initial character set coverage, for each required font, a font subset that comprises only glyphs necessary for the initial character set coverage is generated and stored into memory. The font subset is transmitted along with the respective data segment to a receiving device.

The method may further comprise analyzing the text content of a subsequent data segment to determine required fonts and character set coverage for the respective data segment. For each required font, a current font subset that comprises only glyphs necessary for the character set coverage is generated. The current font subset is compared with the previous font subset, and those glyphs that have been sent in a previous font subset are removed from the current font subset, to produce a reduced font subset. The reduced font subset is stored into memory, and transmitted along with the respective data segment to a receiving device.

BRIEF DESCRIPTION OF THE DRAWINGS

Exemplary embodiments will be more clearly understood from the following detailed description taken in conjunction with the accompanying drawings. FIGS. 1-3 represent non-limiting, exemplary embodiments as described herein.

DETAILED DESCRIPTION

For simplicity and illustrative purposes, the principles of the invention are described by referring to exemplary embodiments thereof. The exemplary embodiments mainly refer to a method of delivering font data for time-based video/audio presentations (known as streaming). However, one of ordinary skill in the art will readily recognize that the same principles are equally applicable to many types of media presentation situations. Thus, the scope of the invention encompasses those situations in which the transmission of media content requires the delivery of font data.

Exemplary embodiments provide incremental updates to a communication or receiving device, wired or wireless (e.g., set-top box, mobile phone, PDA, computer system, etc.) and the interactive components thereof (e.g., video clips, graphics, and text). The incremental updating is similar to that provided in broadcasting and printing updates. A user selects content to be downloaded by browsing mixed interactive media, text, and/or graphics. The information obtained upon browsing is sliced into small portions, and transmitted as individual segments. In a digital transmission, adaptation to the information occurs within a short time period and the text strings change over time, and thus, there is a requirement for the font subsets to change in accordance with the content to be displayed. A line-by-line change involves incremental subsets.

Conventional digital transmission may involve the same transmission sequentially repeated for many users. For example, with mobile or cell phone technology, there is no one start time and multiple users can initiate the beginning of a transmission at different times. Thus, the same content is repeated for various users at different times. In contrast, with television, if a program is broadcast at 7:00 pm, but the user does not tune in until 7:10 pm, the missed portion will not be repeated and the user simply misses the first ten minutes of the broadcasted program.

Exemplary embodiments are provided to serve multiple clients through a digital server or client application. Exemplary embodiments provide a method that allows content to be displayed incrementally in different media at incremental times. In digital technology involving cell phones and PDAs, service to multiple users at different times needs to be provided. The users need to be able to view complete transmissions regardless of when the users begin to receive the transmission. Because each transmission is the same for each user, certain portions of the transmission may be re-used, but directed to different respective users.

Font streaming can be implemented by assembling different subsets of the same font together on a device, thus reusing previously sent characters for rendering of subsequent text strings. This concept is taken into consideration when font subsets are created, thereby reducing the redundancy of font data transmission.

In Table 1 that follows, an example of a dialog appearing as a part of a video presentation with subtitles is illustrated.

TABLE 1

| | Dialog | Required Font Subset | Font Subset after Font Streaming |
|---|---|---|---|
| Line 1 | Where is the Main street? | M W a e h i n r s t ? | M W a e h i n r s t ? |
| Line 2 | Turn right at the next light | T a e g h i l n r t u x | T g l u x |
| Line 3 | Thank you | T a h k n o u y | k o y |

Referring to Table 1, the rendering of the first line of text requires a font subset that includes the characters "M W a e h i n r s t ?". The second line of text requires the subset "T a e g h i l n r t u x". The third subset contains the characters "T a h k n o u y." The font subset that is transmitted for the first line of text contains the characters "M W a e h i n r s t ?". The font subset that is transmitted for the second line of text, after removing redundancy, contains the characters "T g l u x". The non-redundant font subset that is streamed for the third line of text contains the characters "k o y".

As illustrated above, the total number of characters in the three original subsets is reduced from 31 to 19 when non-redundant font streaming is used. These subsets can be assembled (or linked together) in the receiving device as a single font. The process can be repeated if necessary, either in predetermined time intervals or to accommodate for breakdowns in transmission or stream resynchronization requirements.

Figure 1:
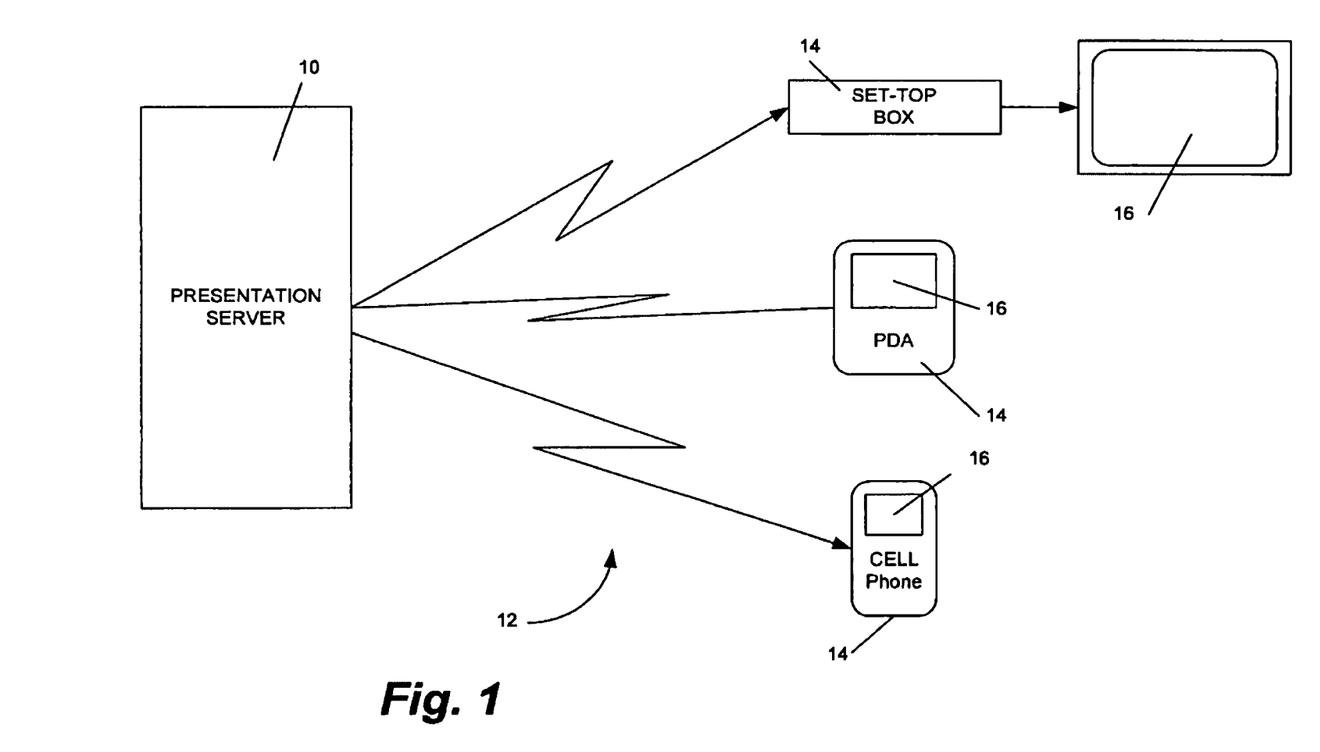
FIG. 1 is a general schematic illustration of an exemplary system in which the concepts of the present invention can be implemented.

One example of a media presentation system, in which the present invention can be implemented, is illustrated in FIG. 1. A multimedia signal, containing any one or more of video, audio, text and graphic content, is transmitted to users by a presentation server 10, via a suitable network 12. Each of a plurality of receivers 14 is configured to recognize the transmissions from the server and process received multimedia signals for presentation on a suitable display device 16. Depending upon the type of system, the network and receivers can be embodied in various forms. In a cable TV system, for example, the receivers 14 might be set-top boxes or the like, and the transmission media for the network can be coaxial and/or fiber-optic cable, and could also include microwave or other wireless media. Likewise, in a satellite television system, set-top boxes could be connected to suitable interface equipment to communicate with satellite transceivers.

Alternatively, the system could be a cellular telephone or Wi-Fi environment. In these cases, the receivers can be mobile telephones or PDAs with built-in displays and suitable wireless interfaces for communication with base stations, wireless network access points, etc.

Depending on the nature of the system, the multimedia signal can be broadcast to all receivers simultaneously, for instance in the case of a cable satellite television network. To support video-on-demand capabilities, the signal might be re-broadcast in cyclic segments. In other systems, the transmissions might be point-to-point, to provide true real-time on-demand functionality.

Figure 2:
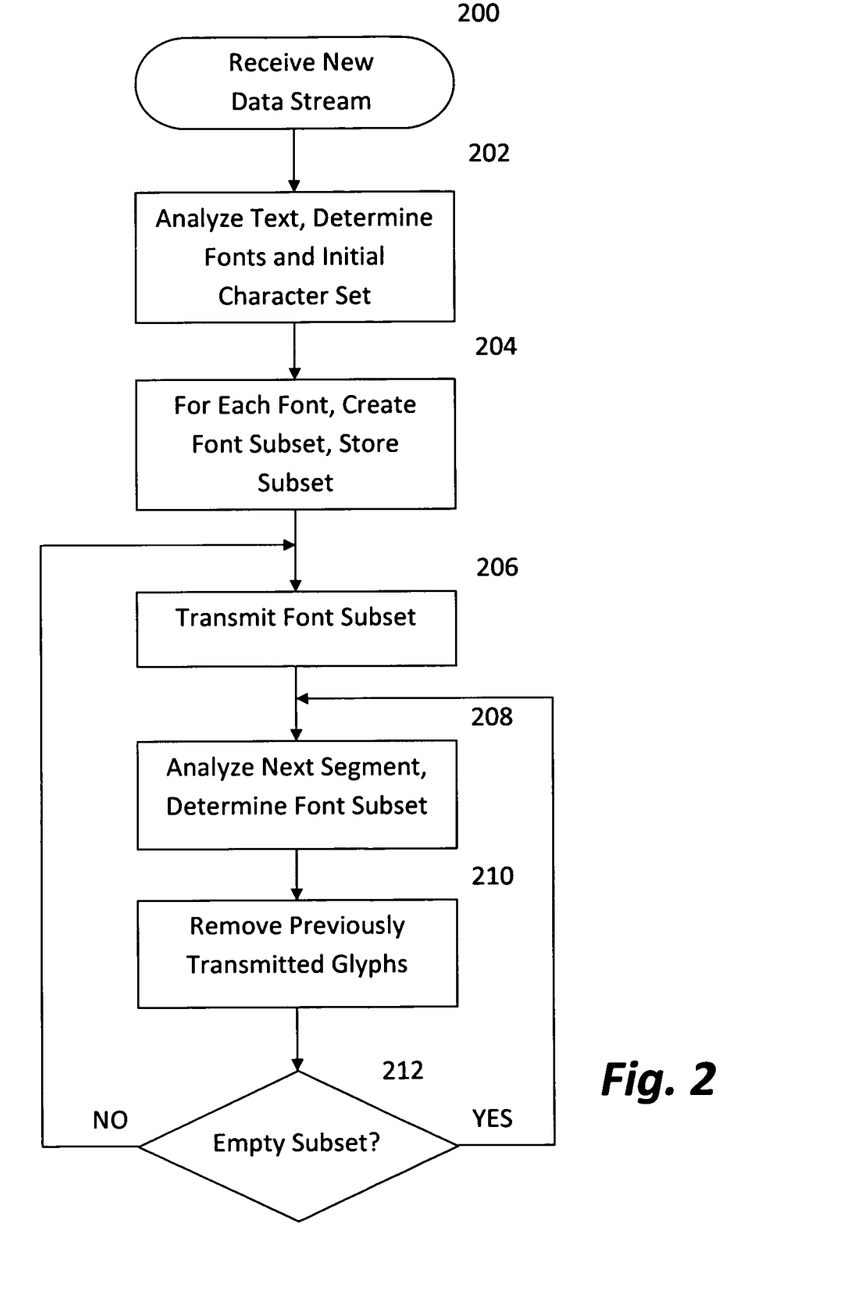
FIG. 2 is a flowchart illustrating a method for font data streaming according to exemplary embodiments.

Referring to FIG. 2, a process for implementing the principles of the invention in such networks is illustrated in flowchart form. The media presentation is subdivided into small, time-stamped data segments, where each segment represents a unit of information (e.g., audio) or a collection of multiple different units of data (e.g., video, audio, subtitles, and fonts) to be played/displayed during a certain time period. When a device begins to receive a data stream at step 200, the text content of the first data segment to be presented in the next time period is analyzed to determine the required fonts and the initial character set coverage (step 202). For each required font, a font subset that provides a minimal number of glyphs for the initial character set coverage is created and stored at step 204. This font subset is transmitted to a receiving device at step 206.

The text content of a subsequent data segment is then analyzed to determine the required fonts and character set coverage for the respective data segment at step 208. For each required font, a new font subset that comprises only the glyphs necessary for the character set coverage is created. The new font subset is compared with the previous font subset and glyphs that have been sent in the previous subset are removed at step 210, thereby producing a reduced font subset. If at least one glyph remains after all of the previously transmitted glyphs have been removed, as determined at step 212, the reduced font subset is stored and transmitted along with the respective data segment to the receiving device at step 206. If however, the reduced font subset is empty, i.e., all of the glyphs of the font subset have been previously transmitted, the process returns to step 208 to determine the character and glyph subset for the next time segment, for the given font.

Thus, the media presentation is subdivided into data segments where each segment is transmitted and buffered by a receiver while the previously sent data segment is rendered. As long as the data transmission speed is fast enough to allow data blocks be transmitted faster than the amount of time it takes to play the segment of media presentation, a continuous program playback can be achieved.

As illustrated in the above example, the method for font data streaming according to the exemplary embodiments of the invention eliminates the need for constant repetition (re-transmission) of the same font data chunks in a broadcast or multicast environment. In a multicast environment, where different terminals may request the start of a transmission of media content at different times from the beginning (e.g., prior time segments. Table 2 below relates to such a situation, and provides an example of a dialog appearing as part of a movie script presentation. The Time Stamps that appear in column 1 of the table correspond to the beginning of successive time segments for the presentation. Text messages are transmitted from a content server (e.g., a digital cable broadcast server or a mobile TV network IP server) to a receiving terminal (e.g., a cable box or a wireless mobile device) along with the media segments, to enable English language subtitles be displayed in a particular typeface that is chosen by content authors. The table depicts an example in which three different terminals, A, B and C, tune into the presentation at different times. Terminal A tunes in prior to the start of the presentation, terminal B tunes in after time $T_1$ but prior to time $T_2$, and terminal C tunes in after time $T_2$ but prior to time $T_3$. The content server is notified as each terminal tunes into the presentation, e.g. via login data transmitted by the respective terminals, and sends an appropriate multicast signal that is addressed to each of the respective terminals.

TABLE 2

| Time Stamp | Text message | Terminal A (starts receiving broadcast at $T_1$) | Terminal B (starts receiving broadcast at $T_2$) | Terminal C (starts receiving broadcast at $T_3$) |
|---|---|---|---|---|
| $T_1$ | I'm serious. It was the best first date ever. | '. I a b d e f i m o r s t u v w | | |
| $T_2$ | She was amazing. She looked exactly like her picture. | S c g h k l n p x y z | . S a c d e g h i k l m n o p r s t u w x y z | |
| $T_3$ | You'll never see her again. | Y | ' Y v | '. Y a e g h i l n o r s u v |
| $T_4$ | How do you know? | ? H | ? H | ? H d k w y |
| $T_5$ | Because you look nothing like yours. | B | B | B c t |

"Video On Demand" services), the reduced font data subsets created for respective segments will be resent at different times to different receiving devices, thereby minimizing the amount of data sent and optimizing the bandwidth usage.

Figure 3:
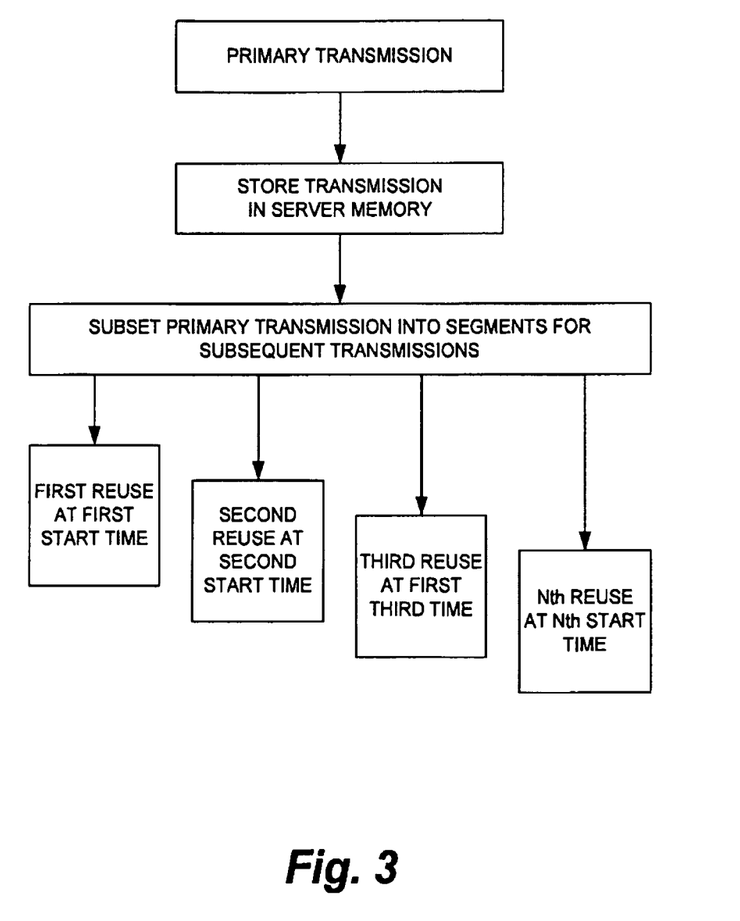
FIG. 3 is a diagram illustrating the data reuse concept of the font data streaming method in a multicast environment.

Referring to FIG. 3, once a primary transmission is complete, the transmitted information is retained in the memory of the server. This information may be subdivided into transmission segments (e.g., for a first user at a first start time, a second user at a second start time subsequent to the first start time, a third user at a third start time subsequent to the second start time, and etc.). On a cell phone or PDA, each user will view a complete transmission regardless of the start time by the user.

According to the method of the exemplary embodiments of the invention, due to the different start times, the information from a first transmission can be used again for subsequent users thereby saving time and avoiding redundancy in action. Thus, subsequent transmissions are built on subsets previously used.

The foregoing embodiment pertains to those situations in which the viewer is able to receive the media presentation from its beginning, e.g. the viewer tunes into a television program at or before the time it is scheduled to start, or video-on-demand service is available. In these situations, the viewer will receive all of the font subsets that are needed to properly reproduce any of the textual characters that accompany the presentation.

In other situations where on-demand service is not available, the viewer may tune into a presentation, e.g., a broadcast presentation, some time after it has begun, and does not have the ability to receive the information that was transmitted for Referring to Table 2, the columns that correspond to the different terminals A, B, and C demonstrate the respective font data subsets that are to be transmitted to each device. At each initial time stamp interval, the initial font subset includes only those glyphs that are necessary to render and display a text message transmitted at that same time. The subsequent font subsets include only incremental updates between the previously transmitted font subsets and the new set of glyphs required to display a new text message. If all necessary glyph data has already been transmitted, no font data transmission takes place during the given time interval.

Thus, at time $T_1$, the font subset transmitted to terminal A comprises the glyphs for all of the characters that appear in the text message for segment 1 of the presentation. At time $T_2$, a reduced font subset is transmitted to terminal A, which comprises the font subset for the characters of segment 2, minus those whose data was previously transmitted for segment 1. At the same time, however, since terminal B logged in after time $T_1$, the complete font subset for segment 2 is transmitted to terminal B, as it did not receive any prior character information.

Likewise, at time $T_3$, terminal A receives another reduced font subset for segment 3, as does terminal B, which are based upon the character data that was previously transmitted to each terminal, respectively. In the meantime, terminal C logged in after time $T_2$, and so it receives the complete font subset for segment 3.

Exemplary embodiments of the invention provide a method of font data streaming that is able to support different media delivery scenarios and routing schemes. The method may be utilized in either "one to one" or "one to many"

transmission, in broadcast and multicast transmissions, and allows different terminals to tune into a media broadcast at different times. Font data streaming assures that the minimal set of necessary font information is always present at the receiving terminal at the time when the text message is to be displayed. Accordingly, the previously mentioned redundancy in font data transmission is eliminated by sending only the minimal incremental subset of required font data to each terminal.

It will be appreciated by those skilled in the art that the present invention can be embodied in other specific forms without departing from the spirit or essential characteristics thereof. The presently disclosed embodiments are therefore considered in all respects to be illustrative and not restricted.

What is claimed is:

1. A method of font data streaming in relation to font data transmissions, the method comprising steps as follows:
   subdividing a portion of a media stream into data segments, the media stream including character data and font data;
   analyzing, by a server and independent of a first receiving device, text content of a data segment to determine any required fonts and an initial character set coverage for that data segment;
   for each required font, generating and storing into memory of the server a font subset that comprises only glyphs necessary for the initial character set coverage;
   after initiating transmission of the media stream to the first receiving device, transmitting from the server the font subset of the respective data segment to the first receiving device; and
   initiating transmission of a subsequent font subset that comprises additional glyphs for character coverage of a subsequent data segment that has not been previously sent, wherein the subsequent font subset is determined by comparing character set coverage for the subsequent data segment to any previously sent font subset;
   wherein said steps reduce redundancy in font data transmissions through reducing total number of glyphs provided in one or more subsequent font subsets determined for subsequent data segments of the media stream being transmitted to said first receiving device.

2. The method of claim 1, wherein each data segment represents a unit of data or a collection of multiple different units of data including video, audio, subtitles, and fonts.

3. The method of claim 1, wherein initiating transmission of the subsequent font subset comprises:
   analyzing text content of the subsequent data segment to determine required fonts and character set coverage for the subsequent data segment;
   for each required font, generating a current font subset that comprises only glyphs necessary for the character set coverage for the subsequent data segment;
   comparing, by the server, the current font subset with any previous font subset and removing from the current font subset those glyphs that have been sent in a previous font subset, to produce the subsequent font subset;
   storing the subsequent font subset into memory; and
   transmitting the subsequent font subset of the subsequent data segment to the first receiving device.

4. The method of claim 3, further comprising:
   storing the previous font subset at the first receiving device; and
   updating the font subset stored at the first receiving device by adding the subsequent font subset to the stored previous font subset.

5. The method of claim 3, wherein the font subsets are stored at the server.

6. The method of claim 1, wherein the data stream is transmitted to a plurality of receiving devices that receive the data stream at different times and each device views a complete transmission regardless of a viewing start time by the device.

7. The method of claim 6, wherein the font subset and the respective data segment are transmitted and stored at a first device and subsequently transmitted and stored at other devices.

8. A method of font data streaming, the method comprising steps as follows:
   subdividing a portion of a media stream into data segments, the media stream including character data and font data;
   analyzing, by a server and independent of a first receiving device, text content of a data segment to determine required fonts and an initial character set coverage for that data segment;
   for each required font, generating and storing into memory of the server a font subset that comprises only glyphs necessary the initial character set coverage;
   after initiating transmission of the media stream to the first receiving device, transmitting from the server the font subset of the respective data segment to the first receiving device; and
   transmitting a subsequent font subset that comprises additional glyphs for character set coverage of a subsequent data segment that has not been previously sent, wherein the subsequent font subset is determined by comparing character set coverage for the subsequent data segment with any previously sent font subset;
   wherein said steps reduce redundancy in font data transmissions through reducing total number of glyphs provided in one or more subsequent font subsets determined for subsequent data segments of the media stream being transmitted to said first receiving device.

9. The method of claim 8, wherein said transmitting of said subsequent font subset comprises:
   analyzing text content of the subsequent data segment to determine required fonts and character set coverage for the subsequent data segment;
   for each required font, generating a current font subset that comprises only glyphs necessary for the character set coverage for the subsequent data segment;
   comparing, by the server, the current font subset with any previous font subset and removing from the current font subset those glyphs that have been sent in a previous font subset, to produce the subsequent font subset;
   storing the subsequent font subset in memory; and
   transmitting the subsequent font subset of the subsequent data segment to the first receiving device.

10. The method of claim 9, further comprising:
    storing the previous font subset at the first receiving device; and
    updating the font subset stored at the first receiving device by adding the subsequent font subset to the stored previous font subset.

11. The method of claim 8, wherein each font subset and its respective data segment are transmitted and stored at a first device, and subsequently transmitted and stored at other devices.

12. The method of claim 8, wherein the font subsets are stored at the server.

13. A computing device-implemented method, comprising:
    subdividing a portion of a media stream into data segments, the media stream including character data and font data;

analyzing, by the computing device and independent of a first receiving device, text content of a data segment to determine any required fonts and an initial character set coverage for that data segment;

for each required font, generating and storing into memory of the computing device a font subset that comprises only glyphs necessary for the initial character set coverage;

after initiating transmission of the media stream to the first receiving device and independent of the first receiving device, transmitting from the computing device the font subset of the data segment to the first receiving device; and for each subsequent data segment:

analyzing text content of the respective subsequent data segment to determine required fonts and character set coverage for the respective subsequent data segment, for each required font, generating a current font subset that includes only glyphs necessary for the character set coverage for the respective subsequent data segment, comparing, by the computing device, the current font subset of the respective subsequent data segment with any previous font subset and removing any previously sent glyphs from the current font subset, to produce a reduced font subset for the respective subsequent data segment, storing the reduced font subset into memory, and transmitting the reduced font subset of the respective subsequent data segment to the first receiving device.

14. The computing device-implemented method of claim 13, wherein each data segment represents at least one of video, audio or text.

15. A system comprising:
a computing device comprising:
a memory configured to store instructions; and
a processor to execute the instructions to perform operations comprising:

subdividing a portion of a media stream into data segments, the media stream including character data and font data;

analyzing, independent of a first receiving device, text content of a data segment to determine any required fonts and an initial character set coverage for that data segment;

for each required font, generating and storing into the memory of the computing device a font subset that comprises only glyphs necessary for the initial character set coverage;

after initiating transmission of the media stream to the first receiving device and independent of the first receiving device, transmitting from the computing device the font subset of the data segment to the first receiving device; and for each subsequent data segment:

analyzing text content of the respective subsequent data segment to determine required fonts and character set coverage for the respective subsequent data segment, for each required font, generating a current font subset that includes only glyphs necessary for the character set coverage for the respective subsequent data segment, comparing, by the computing device, the current font subset of the respective subsequent data segment with any previous font subset and removing any previously sent glyphs from the current font subset, to produce a reduced font subset for the respective subsequent data segment, storing the reduced font subset into memory, and transmitting the reduced font subset of the respective subsequent data segment to the first receiving device.

16. The system of claim 15, wherein each data segment represents at least one of video, audio or text.

* * * * *